Figure 1:
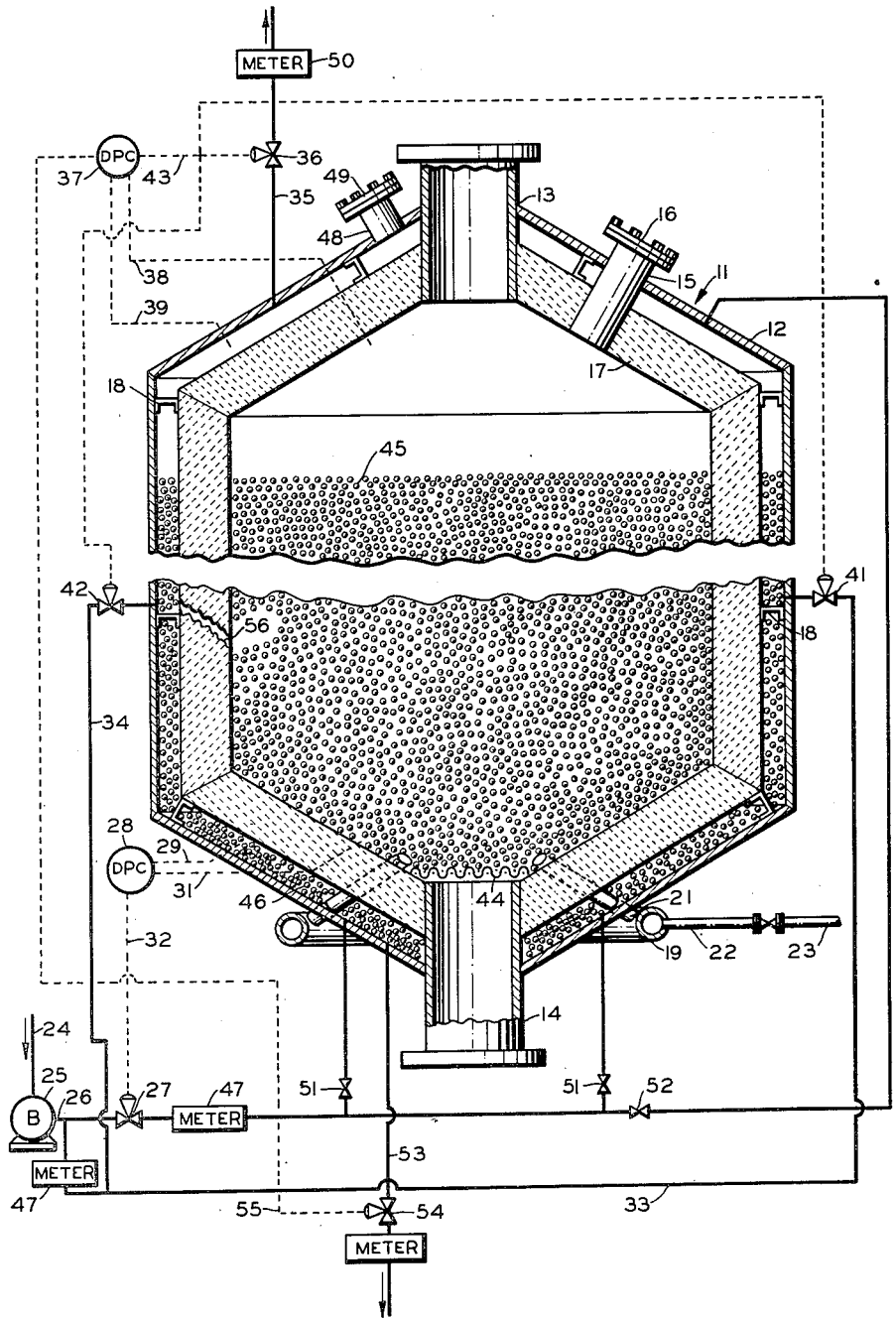

INVENTORS.
L.C. BEARER
GOOCH HILL
BY Hudson and Young
ATTORNEYS

Dec. 9, 1952    L. C. BEARER ET AL    2,621,105
HIGH-TEMPERATURE SOLID MATERIAL-FLUID CONTACT
APPARATUS AND METHOD OF OPERATION
Filed Oct. 28, 1949    2 SHEETS—SHEET 2

INVENTORS.
L. C. BEARER
GOOCH HILL
BY Hudson and Young
ATTORNEYS

Patented Dec. 9, 1952

2,621,105

UNITED STATES PATENT OFFICE 2,621,105

HIGH-TEMPERATURE SOLID MATERIAL-FLUID CONTACT APPARATUS AND METHOD OF OPERATION

Louis C. Bearer and Gooch Hill, Bartlesville, Okla., assignors to Phillips Petroleum Company, a corporation of Delaware Application October 28, 1949, Serial No. 124,194

8 Claims. (Cl. 23—1)

This invention relates to high temperature, solid material-fluid contact chambers. In one of its more specific aspects it relates to improved pebble heater apparatus. In another of its more specific aspects it relates to high temperature fixed bed chambers.

Many different types of chambers are conventionally used for contacting solid contact material, which may be a heat carrier, a catalyst, or the like, with a fluid to be reformed, polymerized, thermally or catalytically cracked, or the like. In any high temperature chamber, it is the conventional practice to line the inner surface of the chamber with an insulation material so as to protect the outer shell from the deleterious effect of the high temperature. Ordinarily some breaks develop in that insulation lining during operation and hot fluid escapes from the contact chamber through the insulation lining and contacts the outer shell which ordinarily rapidly deteriorates at the high temperature. This is particularly true in pebble heater apparatus in which the operating temperatures often range between 1600° F. and 3500° F. The outer shell of the chambers is ordinarily formed of low carbon steel and cannot withstand the stress which is placed upon it by direct contact with the high temperature fluid. Ordinarily the steel will be burned or rapidly oxidized under such conditions and will soon require a shutdown of the installation for repairs to the shell and to the insulating lining.

Broadly speaking, this invention comprises a high temperature solid material-fluid contact chamber in which a space is provided between the insulation lining and the outer shell of the chamber. A gas, which preferably is inert to the reaction being carried on within the chamber, is introduced into the space between the insulation lining and the outer shell and caused to flow therebetween while being maintained at a pressure at least as great as the pressure of the fluid at comparable levels within the contact chamber.

An object of this invention is to provide an improved high temperature, solid material-fluid contact chamber which is more resistant to heat deterioration than are conventional chambers. Another object of this invention is to provide means for preventing leakage of hot fluid through the insulation lining of high temperature contact chambers. Another object of the invention is to provide a method for preventing high temperature fluids from escaping through breaks in the lining of high temperature chambers. Another object of the invention is to provide means for sealing the outer shell of a high temperature chamber from hot fluids by means of a blanket of a cooler gas at a pressure equal to that of the contact fluid at comparable levels in the contact chamber. Another object of the invention is to provide means for sealing the outer shell of a high temperature chamber from hot fluids by means of a small flowing blanket of cooler gas despite breaks in the inner lining of the chamber. Other and further objects and advantages will be apparent to those skilled in the art upon study of the accompanying disclosure and the drawings.

Figure 2:
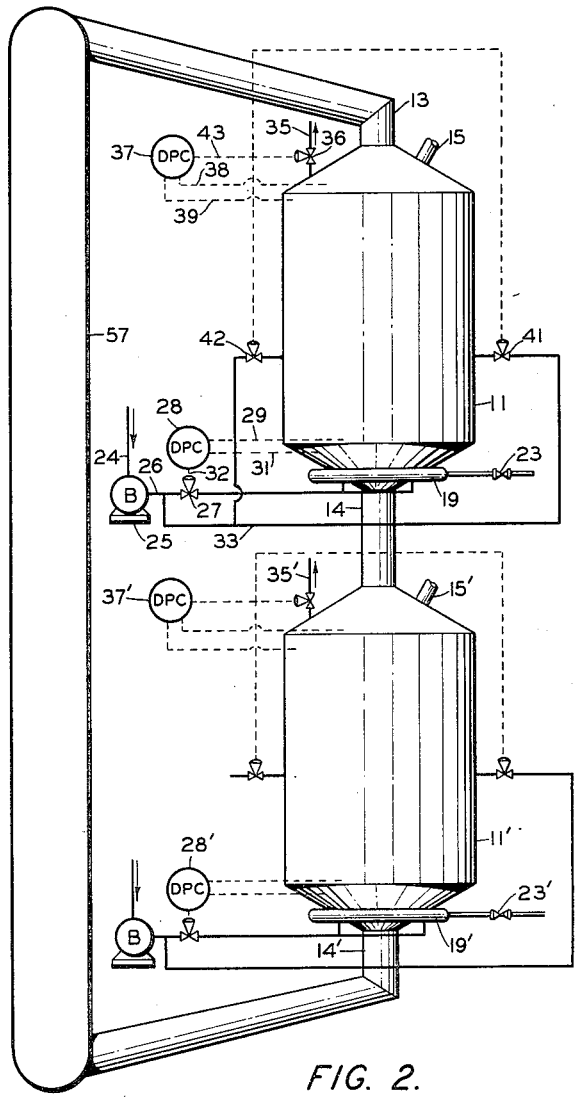
Figure 3:
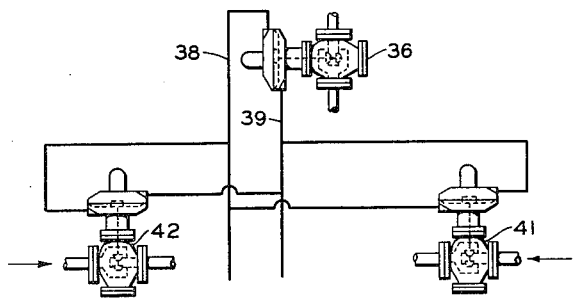

Better understanding of the invention will be obtained upon reference to the drawings in which Figure 1 is an elevation in section of the solid material-fluid contact chamber of this invention, together with a flow plan used for providing the sealing gas for the chamber. Figure 2 is a schematic elevation of the pebble heater apparatus of this invention showing the means by which the sealing gas is provided to the chambers and means by which the flow of the gas to the chambers is controlled. Figure 3 is a diagrammatic representation of a modification of the control members in the upper and intermediate portions of the chamber.

Referring particularly to Figure 1 of the drawings, contact chamber 11 comprises outer shell 12 which is closed at its upper and lower ends but which is provided with a conduit 13 in its upper end and a second conduit 14 in its lower end. Conduit 13 may be either a solid material inlet, a reactant material inlet, or a reaction products outlet, depending upon the process to which the contact chamber 11 is adapted. Conduit 14 may be either a solid material outlet conduit or a reactant material inlet conduit or a reaction product outlet conduit, depending upon the process to which the chamber is adapted. Conduit 15 in the upper end portion of chamber 11 may be used only as a manhole or, under certain conditions, cap 16 may be removed and conduit 15 utilized as a gaseous material effluent outlet. Insulation lining 17 may be any high temperature insulation material, such as refractory or super-refractory materials. Lining 17, which forms an inner shell of chamber 11, is affixed to outer shell 12 by a plurality of hanger members 18. Conduits 13, 14, and 15 extend to the interior of shell 17.

Header member 19 is provided adjacent the lower end of chamber 11 and communicates with the interior of inner shell 17 by means of conduits 21. Reactant material inlet conduit 22 extends between a reactant material supply source, not shown, and header member 19, and is provided intermediate its ends with a valve member 23. Gaseous material supply conduit 24 extends between a gaseous material supply source, not shown, and blower 25. Blower 25 may be provided with conventional controls to maintain a constant discharge pressure. Conduit 26 extends between blower 25 and the lower end of the space formed between outer shell 12 and inner shell 17. Valve 27, which may be a motor valve or a conventional diaphragm valve, is provided intermediate the ends of conduit 26. Differential pressure control 28 is connected to a fluid pressure conduit 29 which extends into the lower portion of the space between outer shell 12 and inner shell 17. Fluid pressure conduit 31 extends between the interior of inner shell 17 at substantially the same level as conduit 29 and differential pressure control 28. Control conduit 32 extends between differential pressure control 28 and valve 27. Conduit 33 extends between conduit 26 at a point intermediate blower 25 and valve 27 and a point in the middle portion of outer shell 12. Any number of auxiliary conduits 34 may extend between conduit 33 and points intermediate the ends of outer shell 12.

Gaseous material outlet conduit 35 extends from the upper end portion of outer shell 12 and may be either a vent or may form a recycle conduit to connect with conduit 24. Valve 36 is provided in conduit 35 and may be a conventional motor valve. Differential pressure control 37 is connected to the interior of inner shell 17 and with the space between outer shell 12 and inner shell 17 by means of pressure conduits 38 and 39, respectively. Valves 41 and 42, which may also be motor valves or diaphragm valves, are provided in conduits 33 and 34, respectively. Valves 36, 41, and 42 are operatively connected to differential pressure control 37 by means of branched conduit 43. Conduits 32 and 43 may be either electrical or fluid conduits, depending upon the type valve with which they communicate.

When chamber 11 is utilized as a fixed bed chamber, screen member 44 is provided in the lower portion of inner shell 17 and forms a support for solid contact material 45 within the chamber. In a preferred form of the invention solid material 46 is used to fill the space between outer shell 12 and inner shell 17 to substantially the same level as the level of the solid material bed within inner shell 17. Meters 47 are provided in conduits 26 and 33 to measure the gas flow therethrough. Solid material inlet conduit 48 is closed by closure member 49. The solid material 46 may be of the same particle size as contact material 45 or may be of various sizes which will produce the desired pressure drop.

In the operation of the device shown as Figure 1 of the drawings, solid contact material is supplied to the interior of inner shell 17 through conduit 13 to any desired level therein. Solid material of a desired size and shape is inserted through conduit 48 into the space formed between outer shell 12 and inner shell 17 and conduit 48 is then closed by closure member 49. The solid material between the two shells is built up to a level substantially that of the solid material bed within shell 17. The feed of reactant materials to the fixed bed within chamber 11 may be downwardly through conduit 13, through the bed of solid contact material, and out through conduit 14 or may be upward through conduit 14, through the bed of solid contact material, and out through conduit 13. A gas which preferably is inert to the reaction being performed within shell 17 is passed through conduit 24, blower 25, and valve 27 in conduit 26 to the packed space between shells 12 and 17. The inert gas passes upwardly about shell 17, if reactants are flowing upwardly in chamber 11, at a pressure substantially equal to the pressure of the fluids within shell 17 at comparable points. If a pressure drop of, for example, ten pounds is encountered in passing the reactant fluid through the solid material bed within shell 17, the space between shell 12 and shell 17 is packed solid material and a similar pressure drop is obtained through the space between the two shells by adjusting the gas flow rate.

When the reactant materials are fed to chamber 11 through conduit 13, valves 51 are closed and valve 52 is open so as to cause the sealing gas to flow through the extension of conduit 26 to the upper end portion of shell 12. The gas is then removed from the lower end of the space between the two shells through outlet conduit 53 and valve 54 which is operatively connected to differential pressure control 37 by means of conduit 55. When the reactant material is fed to shell 17 through conduit 14 and the reaction products are removed from the chamber through conduit 13, the sealing gas is inserted into the space between the two shells through open valves 51 and is prevented from flowing through conduit 26 to the upper portion of chamber 11 by closing valve 52.

The chamber of this invention is very desirable because of its flexibility of operation. If a break should develop in shell 17 as indicated at 56, flow of fluid from the interior of shell 17 through the break against shell 12 is prevented because of the gas in the space formed between the two shells, the gas pressure therein being as great or greater than the pressure of the fluid within inner shell 17. If the pressure of a fluid in the upper portion of shell 17 and the gas between shells 12 and 17 at the upper end of the chamber gets out of balance, differential pressure control 37 will operate to close or open valve 36 and to open or close valves 41 and 42, thus increasing or decreasing the pressure of the gas within the space between outer shell 12 and inner shell 17. As the pressure within the space between shells 12 and 17 diminishes below a desired value, valve 36 is partially closed and valves 41 and 42 are partially opened. As the pressure is brought up to the desired level, valve 36 is opened and valves 41 and 42 are closed. Differential pressure control 28 will operate valve 27 in a like manner in response to the pressure differential measured in the lower portion of shell 17 and the space between shells 12 and 17 as the pressure differential varies from a predetermined value. The flow of gas through conduits 26 and 33 and into the space between shells 12 and 17 is measured on meters 47. Meter 50 in conduit 35 shows the flow of gas from the sealing space and a comparison between meters 47 and 50 will indicate to the operator any development of excessive openings in inner shell 17 by showing that considerable sealing gas is passing through those openings into shell 17 since under normal conditions only a predetermined relatively small flow of gas between shells 12 and 17 is required to maintain the desired pressure conditions.

The description of the device of this invention has to a large extent been limited to the description of fixed bed chambers and methods of operating them. It is obvious that the chamber of this invention will be equally valuable for fluidized operation and for moving contact material beds, such as is found in pebble heater apparatus. Figure 2 is a diagrammatic showing of a pebble heater apparatus in which two chambers, 11 and 11' are connected by conduit 14 and are provided with effluent outlet conduits 15 and 15'. Headers 19 and 19' are provided adjacent the lower ends of their respective chambers and valves 23 and 23' control the flow of fluid into the header members. Outlet conduit 14' in the bottom of chamber 11' is connected to the lower portion of elevator 57 and the upper end of elevator 57 is connected to conduit 13 in the upper end of chamber 11. The sealing system utilized in connection with the device of Figure 2 is the same as that which is more completely described in connection with the chamber of Figure 1 with the exception that the extension of the sealing gas inlet conduit 26 to the upper end of the chambers is omitted, together with outlet conduit 53, valve 54, and conduit 55. These omissions on the pebble heater apparatus of Figure 2 are made for the reason that the flow of pebbles and heating or reactant fluid through the chambers is ordinarily countercurrent. The pebble heater apparatus may, however, be modified by adding the conduits and valves which were omitted from the system described in connection with Figure 1 when it is desired to utilize concurrent pebble and fluid flow through the chambers.

In the operation of the device shown in Figure 2, pebbles are supplied to chamber 11 through inlet conduit 13 and flow downwardly therethrough as a contiguous flowing mass. By the term "pebbles" it is meant to include any solid material of flowable size and shape and which is capable of carrying large amounts of heat from one chamber to another. A heating fluid which may be hot combustion gases or a fuel to be burned on the surface of the pebbles is supplied through valve 23 and header 19 to the lower portion of chamber 11. The hot combustion gases resulting from the combustion of fuel on the pebbles or those which are injected into the lower portion of the chamber flow upwardly through the flowing contiguous mass and are removed from chamber 11 through gaseous material effluent outlet conduit 15. Sealing gas is supplied to the space between the inner and outer shells, which space is packed with a material of a size similar to that of the flowing mass of pebbles. A pressure at least as great as that of the combustion gases within shell 17 is maintained between shell 12 and 17. The sealing gas is removed from the upper portion of chamber 11 through outlet conduit 35. Heated pebbles pass downwardly through conduit 14, which may be provided with a steam choke to prevent the passage of reaction products from chamber 11' to chamber 11, and form a flowing contiguous heated pebble mass in chamber 11', which heated mass of pebbles provides the heat for reaction or conversion of reactant materials which are supplied to the lower portion of chamber 11' through valve 23' and header member 19. Reaction products are removed from the upper portion of chamber 11' through gaseous material outlet conduit 15', and sealing gas which is supplied to the lower portion of the space between shells 12 and 17 is removed through outlet conduit 35'. The pebbles which are cooled in the reaction are removed from the lower end of chamber 11' through outlet conduit 14' and are elevated to the upper portion of chamber 11 by means of elevator 57.

Valves 36, 41, and 42 are sometimes modified to provide a more simple control system in the upper portion of the chamber. These valves are adapted so that valve 36 operates inversely to valves 41 and 42 in direct response to fluid pressure transmitted through conduits 38 and 39.

This invention has the advantage of making possible the continued use of much lower temperature metal materials for construction of high temperature contact chambers which operate at temperatures above about 900° F.

One modification which can be made in the device of this invention is to use perforate rings extending around the chamber as hanger members 18, with the perforations being sized to give the desired pressure drop through the length of the space between shells 12 and 17. Such a modification would make it possible to maintain comparable pressures at comparable levels within the sealing space and the chamber. The method of operating the solid material-fluid is the same regardless of its specific construction. Another modification can be adapted to the structure by providing a sealing space of such thin cross-section that the desired pressure drop through the length of that space can be maintained by varying the rate of gas input to the sealing space.

Many other modifications of the invention described above will be apparent to those skilled in the art upon study of the accompanying disclosure and the drawings. Such modifications are believed to be within the spirit and the scope of this application.

We claim:

1. An improved high temperature, solid material-fluid contact chamber having an inlet end and an outlet end, which comprises in combination an inner refractory shell; an outer shell spaced from the surface of said inner shell throughout its length; a first conduit extending through the upper end of said inner and outer shells; a second conduit extending through the lower end of said inner and outer shells; a bed of contiguous solid contact material in said inner shell; a bed of solid packing material in the space between said inner and outer shells, said packing material being sufficiently pervious to allow substantially the same pressure drop therethrough as that obtainable through the solid contact material bed in said inner shell; a first gas conduit extending from a gas supply source to the inlet end of said outer shell; a first differential pressure control; a first pressure conduit extending between said first differential pressure control and the inlet end of said inner shell; a second pressure conduit extending between said first differential pressure control and the inlet end of said outer shell; a valve in said first gas conduit operatively connected to said first differential pressure control; a gas outlet extending from the outlet end of said outer shell; a second differential pressure control; a third pressure conduit extending between the outlet end of said inner shell and said second differential pressure control; a fourth pressure conduit extending between the outlet end of said outer shell and said second differential pressure control; and a valve in said gas outlet operatively connected to said second differential pressure control.

2. The chamber of claim 1, wherein at least one additional gas conduit extends between said first gas conduit, upstream of said valve therein, and a point intermediate the ends of said outer shell; and a valve in each additional gas conduit operatively connected to said second differential pressure control.

3. An improved high temperature solid material-fluid contact chamber having an inlet end and an outlet end, which comprise in combination an inner refractory shell; an outer shell spaced from the surface of said inner shell throughout its length; a first conduit extending through the upper end of said inner and outer shells; a second conduit extending through the lower end of said inner and outer shells; a bed of contiguous solid contact material in said inner shell; solid packing material in the space between said inner and outer shells and along the major portion of the length thereof, said packing material being sufficiently pervious to allow substantially the same pressure drop therethrough as obtainable through the solid contact material bed in said inner shell; the first gas conduit extending from a gas supply source to the inlet end of said outer shell; a first differential pressure control; a first pressure conduit extending between said first differential pressure control and the inlet end of said inner shell; a second pressure conduit extending between said first differential pressure control and the inlet end of said outer shell; a valve in said first gas conduit operatively connected to said first differential pressure control; a gas outlet extending from the outlet end of said outer shell; and a valve in said gas outlet conduit.

4. The chamber of claim 3 wherein said solid packing material comprises a plurality of perforate hanger members which encircle said inner shell and extend to said outer shell, said hanger members being positioned along the entire length of said shells.

5. The chamber of claim 3, wherein said first conduit is a reactant fluid inlet conduit; said second conduit is a reaction products outlet conduit; a solid material support screen in the lower portion of said inner shell, whereby said solid material in said inner shell is maintained as a fixed bed.

6. The chamber of claim 3, wherein said first conduit is a solid material inlet; said second conduit is a solid material outlet; a gaseous effluent outlet extending through the upper end of said inner and outer shells; and a reactant material inlet conduit extending through the lower ends of said inner and outer conduits.

7. The chamber of claim 3, wherein said first conduit is an effluent outlet; said second conduit is a reactant fluid inlet conduit; and a support screen is provided in the lower portion of said inner shell, whereby said solid contact material in said inner shell is maintained as a fixed bed.

8. A method for operating a pebble heater system which comprises introducing a particulate mass of solid contact material into the upper portion of an insulation lining of a first contact chamber; gravitating said particulate contact material through said insulation lining as a contiguous contact material bed therein; passing a hot heat exchange gas upwardly through said contiguous contact material bed countercurrent to the gravitating flow thereof; removing gaseous effluent from within the upper portion of said insulation lining of said first chamber; encompassing said insulation lining with a cool gas by introducing said cool gas about the inlet end of said lining and removing said cool gas from about the outlet end of said lining; measuring the pressure drop through the length of the insulation lining of said first chamber; maintaining gaseous pressure conditions about said insulation lining comparable to those therein; gravitating said solid contact material from said insulation lining of said first chamber into the insulation lining of a second contact chamber and downwardly therethrough as a contiguous gravitating mass; introducing a gaseous reactant material into the lower portion of said insulation lining of said second contact chamber; passing said reactant material upwardly through and in direct heat exchange with said solid contact material within said second chamber; removing gaseous effluent from the upper portion of the insulation lining of said second chamber; encompassing said insulation lining of said second chamber with a gas, inert to the reaction carried on in said chamber by introducing said gas about the inlet end of said lining and removing gaseous effluent from about the outlet end of said lining; measuring the pressure drop through the insulation lining of said second chamber; maintaining the pressure conditions of said inert gas about the insulation lining of said second chamber comparable to pressure conditions within said insulation lining of said second chamber; removing said solid contact material from the lower portion of said second chamber; and returning said solid contact material to the upper portion of said insulation lining of said first chamber.

LOUIS C. BEARER.
GOOCH HILL.

REFERENCES CITED

The following references are of record in the file of this patent:

UNITED STATES PATENTS

| Number | Name | Date |
| --- | --- | --- |
| 1,090,874 | Pier | Mar. 24, 1914 |
| 1,286,135 | Somermeier | Nov. 26, 1918 |
| 1,962,168 | Andrus | June 12, 1934 |
| 1,969,422 | Pier | Aug. 7, 1934 |
| 2,212,835 | Keane et al. | Aug. 27, 1940 |
| 2,271,955 | Russell | Feb. 3, 1942 |
| 2,545,384 | Rehrig | Mar. 13, 1951 |